(12) United States Patent
Carter et al.

(10) Patent No.: US 9,191,344 B2
(45) Date of Patent: Nov. 17, 2015

(54) VALIDATING CONTENT FROM AN ORIGINAL COMMUNICATION INCLUDED IN A NEW COMMUNICATION

(71) Applicant: International Business Machines Corporation, Armonk, NY (US)

(72) Inventors: Bernadette A. Carter, Raleigh, NC (US); Nikhil R. Parekh, Raleigh, NC (US); Jacques-Marie Thrasybule, Raleigh, NC (US); Cesar A. Wong, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 13/764,166

(22) Filed: Feb. 11, 2013

(65) Prior Publication Data
US 2014/0229551 A1 Aug. 14, 2014

(51) Int. Cl.
*G06F 15/16* (2006.01)
*H04L 12/58* (2006.01)
*G06Q 10/10* (2012.01)

(52) U.S. Cl.
CPC ............. *H04L 51/04* (2013.01); *G06Q 10/107* (2013.01); *H04L 51/32* (2013.01)

(58) Field of Classification Search
USPC ............................... 709/200, 224, 206; 726/4
See application file for complete search history.

(56) References Cited

U.S. PATENT DOCUMENTS

| | | |
|---|---|---|
| 2006/0015736 A1 | 1/2006 | Callas et al. |
| 2006/0116966 A1 | 6/2006 | Pedersen et al. |
| 2007/0208813 A1* | 9/2007 | Blagsvedt et al. ............ 709/206 |
| 2008/0243619 A1* | 10/2008 | Sharman et al. ................ 705/14 |
| 2009/0125596 A1* | 5/2009 | Naick et al. .................... 709/206 |
| 2012/0136951 A1 | 5/2012 | Mulder |

OTHER PUBLICATIONS

Rosenthal, D. "Martin Luther King fake quote/faked Osama death". The Baltimore Sun. May 3, 2011. <http://weblogs.baltimoresun.com/entertainment/books/blog/2011/05/martin_luther_king_fake_quotef.html>.
Zarrella, D. "Visualizing ReTweets". Printed on Dec. 1, 2012. <http//www.slideshare.net/danzarella/visualizing-re-tweets>.

* cited by examiner

*Primary Examiner* — El Hadji Sall
(74) *Attorney, Agent, or Firm* — Noah A. Sharkan (57) ABSTRACT

A method, computer program product, and system for validating content included in an electronic communication is disclosed. A computer receives a new communication that includes content from an original communication. The computer determines if the content included in the new communication includes a change to the original communication. In response to determining that the content includes the change to the original communication, the computer generates a validation score of the new communication, such that the validation score is determined by an amount of match between the content of the new communication and the original communication, and the extent to which the change alters a purport of the original communication.

20 Claims, 3 Drawing Sheets

VALIDATING CONTENT FROM AN ORIGINAL COMMUNICATION INCLUDED IN A NEW COMMUNICATION

FIELD OF THE INVENTION

The present invention relates generally to the field of digital communications, and more particularly to providing an indicator of validity for communications that include a quoted message from an original communication.

BACKGROUND OF THE INVENTION

The use of communication channels of many types has increased greatly, given the proliferation of digitized communication technologies. Similarly, the use of personal networking services has also increased greatly, especially in areas using social media. Social media may be described as interaction among users of digitized communication, forming virtual communities that create, exchange, share and comment on the content of the digitized communication.

Communication channels in widespread use include, for example, telephone voice channels, cellular phone text message channels, computerized instant messaging channels, electronic mail channels, as well as others. Social media networks may utilize Internet-based applications running on mobile and web-based technologies that enable users of social media, thus expanding communications between individuals, communities and organizations.

Social media has become one of the most powerful sources for news updates, information sources, career and professional connections, and topic communities. In addition, social media sources create new opportunities for businesses, which are able to utilize social media for marketing research, sales promotions, and customer relationship development, among others purposes. Different types of social media include collaborative projects, blogs or micro-blogs, social networking sites and topic-specific content communities.

Many media applications enable the creation of user-generated content that may typically be displayed or "posted" to a website page on the internet that can be subscribed to or searched by users. Media content can also be distributed as short message service (SMS), messages. One method of sharing public communication content is by repeating or "re-posting" of one user's content by another user; making the content available to users referred to as "followers" who search for or subscribe to communications by a particular author. Re-posting content extends awareness of new or updated content for view by additional audiences. However, when shared content is "re-posted" or repeated by another user, the content may be intentionally or unintentionally altered. Changes to content can be made in re-postings that may still be equivalent in meaning to the original communication, however, there may be cases in which edits are made that are clearly not equivalent to the original communication.

SUMMARY

Embodiments of the present invention disclose a method, computer program product, and system for validating content included in an electronic communication. A computer receives a new communication that includes content from an original communication. The computer determines if the content included in the new communication includes a change to the original communication. In response to determining that the content includes the change to the original communication, the computer generates a validation score of the new communication, such that the validation score is determined by an amount of match between the content of the new communication and the original communication, and the extent to which the change alters a purport of the original communication. Additionally, in response to determining that the content of the new communication includes the change to the original communication, the computer identifies the change by applying a formatting technique to the change.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

A new communication that includes some or all of the content of an original communication may be shared with multiple users that lack access to the original reference, or lack the willingness to compare the original content to the shared content, such as an email or posted social media content. Embodiments of the present invention compare the repeated or forwarded content to the original communication content and determine if there are changes to the original communication found in the repeated or forwarded version of the communication. Having found changes, the amount of change is determined by a validation score that considers the number of edits, omissions, and additions to the original communication, and determines if the edits involve synonyms, antonyms or significant modifiers of the original content, or if negative or significant modifiers are added or removed, offering a significantly different purport from the original communication. The changes to the repeated or forwarded content from the original communication are identified in the new communication by formatting techniques.

Figure 1:
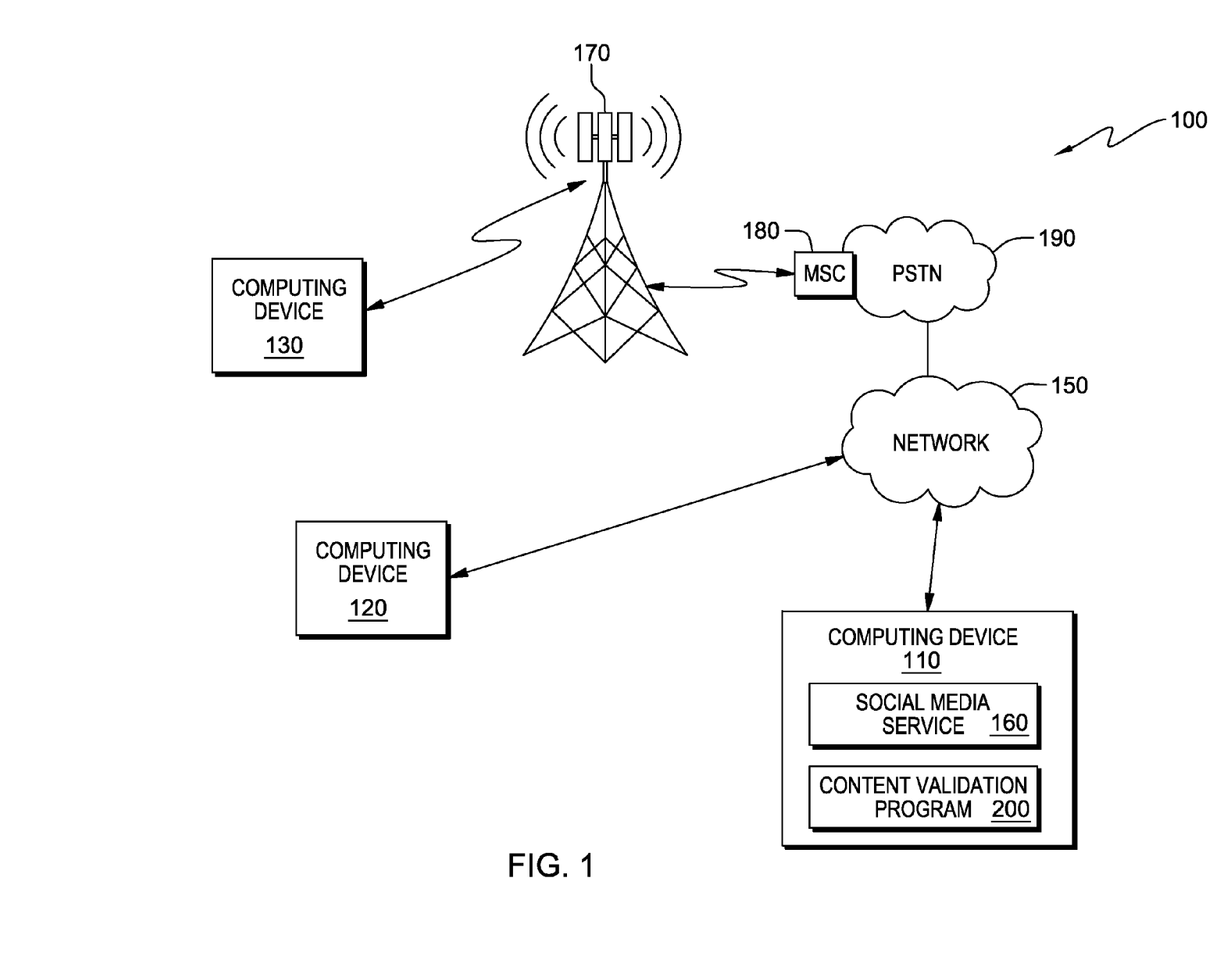
FIG. 1 is a functional block diagram illustrating a distributed communications environment, in accordance with an embodiment of the present invention.

The present invention will now be described in detail with reference to the Figures. FIG. 1 is a functional block diagram illustrating distributed communications environment 100, in accordance with one embodiment of the present invention. Distributed communications environment 100 includes computing devices 110, 120, and 130, network 150, transmission tower 170, mobile switching center (MSC) 180, and public switched telephone network (PSTN) 190.

Network 150 connects all operational computing devices that transmit and receive communications within distributed communications environment 100. Network 150 is illustrated as connected to PSTN 190 by MSC 180. Network 150 can be, for example, a local area network (LAN), a wide area network (WAN), the Internet, a cable network, a fiber optic network, a wireless network or any other network or combinations of networks that connect the computing devices of distributed communications environment 100. In general, network 150 can be any combination of connections and protocols that will support communications between computing devices 110, 120, and 130.

PSTN 190 consists of telephone lines, fiber optic cables, microwave transmission links, cellular networks, communications satellites, undersea telephone cables, and other devices, all inter-connected by switching centers, thus allowing any telecommunications device in the world to communicate with any other. MSC 180 provides a wireless connection from a mobile service network to PSTN 190, connecting mobile computing devices capable of telecommunications, to other computing devices. MSC 180 and PSTN 190, in conjunction with network 150, enable transmission and reception of communications between computing devices of distributed communications environment 100. PSTN 190 may also supported by additional network devices (not shown), which include multiple components supporting the operational handling of telecommunications.

Transmission tower 170 is one of a plurality of transmission towers used to support cellular phone communications and data transmission to mobile devices. Transmission tower 170 receives communications from computing device 130 and ultimately connects the communication to network 150 that in turn may submit the communications to other connected computing devices.

Computing device 130 is illustrated as wirelessly connecting to network 150 by propagation from transmission tower 170 to MSC 180 and PSTN 190. Computing device 130 may be a smart phone, a personal digital assistant (PDA), a tablet or other mobile computing device configured to send and receive text-based communications through PSTN 190. Computing device 130 may also be able to send and receive text-based communications by connecting to a local wireless router, (not shown) that is connected to network 150.

Computing devices 110 and 120 are shown connected to network 150. Computing devices 110 and 120 can be, for example, but are not limited to, a personal computer system, a desk-top computer, a server computer system, a thin client, thick client, a blade server computer, a hand-held device such as a laptop or tablet, a multiprocessor system, a microprocessor-based system, a network PC, a PDA, a smart phone, a minicomputer system, and may be part of a network of computing devices as part of a distributed cloud computing environment that includes any of the above systems or devices. Further, computing devices 110 and 120 can be any programmable electronic device as described in more detail in FIG. 3 and capable of transmitting and receiving communications.

Computing device 110 is illustrated as including social media service 160 and content validation program 200. In one embodiment of the present invention, content validation program 200 is accessible to computing device 110, which may be one or more server computers hosting or supporting a shared communication service, such as social media service 160. In other embodiments, computing device 110 may be a client-based computing device with access to content validation program 200 and a social media service, such as social media service 160. Social media service 160 includes resources for the operational support of a shared media service, which may include receiving communication posts, sending notification of communication posts and other functions for service operations and management.

Examples of social media services may include, but are not limited to: short message service (SMS), wikis, blogs, microblogs, email replies and forwarded email. One of the most common social media services is Twitter (Twitter, Inc.), which is a shared text-based communication service. Computing device users access Twitter (Twitter, Inc.) online via the Internet and are able to view public communications posted by other users. A computing device user can subscribe to "follow" other particular users that publicly share communications, and may receive notification when new communications or updates are "posted", making them available for authorized users to view online. Twitter (Twitter, Inc.) communications are referred to as "Tweets" (Twitter, Inc.), which are authored by a first user are often quoted in a separate communication by a second user, referred to as "Retweets", (Twitter, Inc.) in order to share the content of the original communication, with additional users that may not "follow", or frequently view communication posts by the first user. In general, the content portion of an original communication that is included in a new communication will be referred hereafter as the quoted message, and the portion of the content from the original communication will be referred to as the original message.

In a preferred embodiment of the present invention, the validation of the content of a communication, as determined by content validation program 200, includes text-based messages, however, in other embodiments communication content may include one or a combination of digitized audio files, graphic files, image files, text files or video files, in addition to text-based messages. The validation of the content in a new communication is determined by comparison to the content of the original communication. Validation scores may be produced based on the amount of changed content as a function of the total content.

When a computing device, such as computing device 110, accesses a communication that includes a quoted message, content validation program 200 determines the validity of the quoted message as compared to the original message, and produces a validation score that indicates how closely the quoted message matches the original message. Content validation program 200 analyzes the quoted message, identifying the changes, the type of changes, and determines if a change of the meaning or the purport of the original message has been made by omission or addition of negation terms, omission or addition of modifiers, or substitution of words. Content validation program 200 may operate on a server hosting a social media service or email service, on a distributed computing network, on a web server, or on a client computing device interacting with a social media service.

A text communication may be "posted" by displaying the text communication at a user-accessible network location, for example, a webpage on a website of the Internet. Authorized computing device users may use the social media service to search for text communications, or alternatively, a notification of a posting of text communications may be delivered to the computing device, such as computing device 130. Social media service 160 may enable authorized computing device users that are "following" a particular user of the social media service, to respond to a notification and view the communications posted online by the particular user. "Following" a social media service user is typically associated with receiving notification of new "posts" or updates made by the social media service user being "followed".

In another embodiment of the present invention, computing device 110 may be associated with an email service to users of computing devices, such as computing device 120. Social media service 160 may be an email service operational program operated from computing device 110. An email service includes in part, function to send, receive, reply, and forward email communications to one or more recipients that view email from their respective computing devices. Email replies and forwarded emails typically include the original email content, as well as the capability to add additional content. Email replies and forwarded emails also include the ability to edit the quoted message that may be included from the original email. Recipients of the email reply or forwarded email may not be able to determine the validity of the quoted message and may be reluctant or unable to locate and compare the original message. The content and purport or meaning of the original communication may be significantly changed, with no apparent indication.

Figure 2:
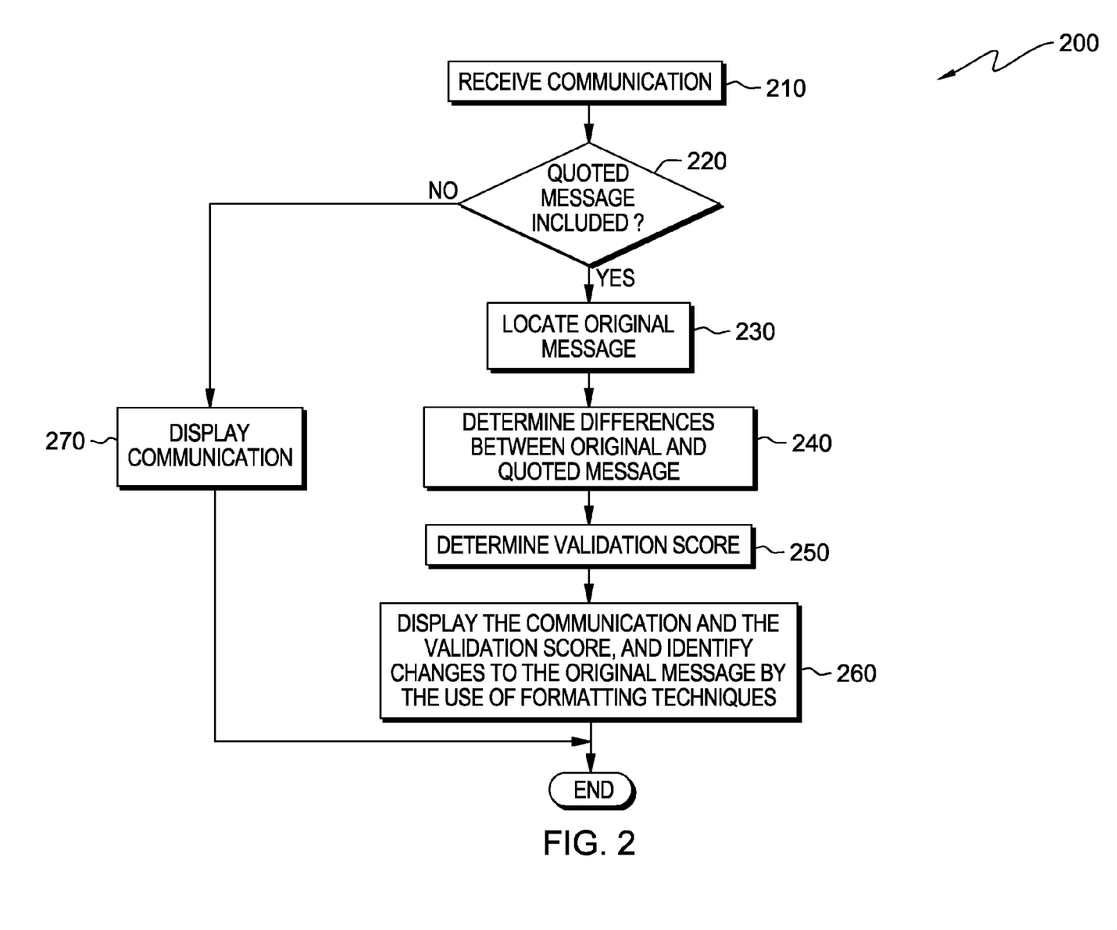
FIG. 2 is a flowchart depicting operational steps of a content validation program, operating on a computing device within the distributed communications environment of FIG. 1, in accordance with an embodiment of the present invention.

FIG. 2 is a flowchart depicting operational steps of content validation program 200, on a computing device within the distributed communications environment of FIG. 1, in accordance with an embodiment of the present invention. Content validation program 200 determines the changes made to the original version of a quoted message that has been included in a separately posted, forwarded, or reply communication.

A computing device receives a communication, searches for a communication, or may receive a notification by which the computing device gains access to a posted communication (step 210). For example, content validation program 200 determines that a communication or notification of a posted communication was received and can be accessed by computing device 110.

Content validation program 200 examines the communication to determine its source, and analyzes the content to determine if the communication includes a quoted message. Determining that the communication does not include a quoted message, (step 220, "no" branch), content validation program 200 displays the communication and may include a message indicating that a quoted message is not included in the communication, and content validation program 200 ends.

For example, content validation program 200 determines the source of the communication is from a Twitter (Twitter, Inc.) account and analyzing the word content of the communication, determines that the "Tweet" (Twitter, Inc.) contains only original content and there is no quoted message, such as a "Retweet" (Twitter, Inc.), within the communication. Content validation program 200 displays the communication as received and may optionally add a small message or icon indicating that the communication does not include a quoted message.

Determining that the communication does include a quoted message, (step 220, "yes" branch), content validation program 200 searches the social media service to locate the original message that was quoted in the communication (step 230). For example, having determined that a quoted message is included in a received communication, such as a Retweet (Twitter, Inc.) that is included within a subsequent Tweet (Twitter, Inc.), content validation program 200 searches the social media service source, to locate the original message associated with the quoted message, which is included as a Retweet (Twitter, Inc.) within the subsequent Tweet (Twitter, Inc.). Content validity program 200 identifies the original message from the reference within the RT.

Content validation program 200 analyzes the original message and the quoted message and determines the differences between the messages (step 240). The analysis includes determining the number of words, the type of words and phrases, (noun, verb, adjective, prepositional phrase) of each message, and determining omitted words, added words, substituted words, and negation. Substituted words are further analyzed to determine if they are synonyms or antonyms of original words, or if they are abbreviations or acronyms.

For example, content validation program 200 analyzes the words and structure of the quoted message within the received communication and the located original message. Content validation program 200 compares the quoted message content and the original message content, looking for total words, omitted words, substituted words, additional words, singular or plural designation and negation terms. Content validation program 200 determines the differences between the original message and the quoted message. Some word types, such as articles, prepositions, and negation terms, for example, may be identified by the use of lookup lists, dictionary or thesaurus files.

In one embodiment, the analysis by content validation program 200 determines that all or nearly all the words in the quoted message are different from the original message. Content validation program 200 may optionally determine if the words in the quoted message indicate a translation of the original message into a different language (accessing and comparing words with a translation dictionary). Content validation program 200 may include a message stating that the quoted message may be a translation (not shown).

Having determined the differences between the original message and the quoted message, content validation program 200 determines a validation score. In one embodiment, the score is created by enumerating the instances of matched words, substituted words, omitted words, added words and giving higher weight to keywords such as subject nouns, verbs, verb tense, and modifiers, and lower weight to articles and some prepositions (step 250).

For example, content validation program 200 enumerates instances of matching between the original message and the quoted messages, such as the number of words, identified key words including the subject noun, direct modifiers, the verb, verb tense, prepositional phrases, and key words that indicate negation. Content validation program 200 assigns values based on the closeness of match between the original and quoted message. Words that are substituted but are reasonable synonyms may be scored as a near-exact match, whereas a substituted word that is not a synonym may be scored lower, and an antonym, indicating meaning in the opposite sense of the original word, may subtract from the score. Content validation program 200 gives very low weight to some words, such as articles and possibly prepositions, but gives higher weight to keywords, verb and verb tense, significant modifier changes, and omission or addition of negation terms.

In one embodiment, content validation 200 generates a score from the comparison of the original message and quoted message, which may be within a predetermined range, such as 0-100. In this scenario, scores tending towards a zero value reflect very significant difference between the quoted and original message, possibly even opposite meaning, whereas scores tending towards a 100 value reflect a higher level of validity and consistent meaning between the quoted and original message.

Using a simple quoted message, such as "The new movie that we saw yesterday evening was awesome", an example of a validity score can be described. The quoted message includes 10 words, with "movie", as a subject, "was", as a past tense verb, "that we saw yesterday evening", as a relative clause pointing to the subject, and "new" and "awesome", as modifiers. Additionally, "The" as an article may be valued lower than other words in the quoted message. If the original message was actually, "The old movie that we saw yesterday night was awful", content validation program 200 will analyze and compare the two messages. Both contain 10 words and may be valued at 10 points per word, for a scaling of 0-100 for example. In some embodiments, the article "The" may be valued at 5 points as having lower importance, and the subject "movie", may be valued at 15 points as having higher weighting and higher importance.

Content validation program 200 compares substituted words of "new" and "old", and finds them to be antonyms, and similarly compares "awesome" and "awful", and finds them to be antonyms (by access to a thesaurus function or application). Content validation program 200 compares "evening" and "night", and determines that they are not exact synonyms but are not antonyms and values the substituted word "night" with 7 points. Content validation program 200 values each of the matching 7 words and determines a score of 70 points (5+15+50 pts). Additionally, 7 points are added to the score for "night", as a substitute for evening. Since the words "new" and "awesome", are substituted by words having an opposite purport or meaning, content validation program 200 subtracts a substantial value to indicate the validity of the quoted message is poor. For example, 30 points for each instance of a substituted antonym may be removed from the score, resulting in this case, with a validation score of 17 (77–60), indicating that the validity of the quoted message is very poor in comparison to the original message. Content validation program 200 may display the validation score adjacent to or in proximity of the communication, and may include formatting to provide quick indication of the validity of the quoted message.

In addition to displaying the validation score, content validation program 200 identifies changes to the quoted message that reflect the differences from the original message. The changes to the quoted message are displayed in a manner that identifies the type of change that is included in the quoted message. A type of a change may include a substituted word that has the same or nearly the same meaning, or may be an abbreviation or acronym of words in the original message. Another type of change may be when a substituted word is an antonym of the original word, an omitted word or an additional word with different or neutral meaning. Content validation program 200 identifies words that are substituted, omitted or added, and indicates if a word is a synonym, antonym or neutrally different than the counterpart word in the original message, by consistently using a formatting technique associated with the type of change. The changes within the quoted message that include words added or omitted from the original message, are also identified within the display of the communication by content validation program 200, to present a visual indication of validity (step 260). After displaying the validation score and indicating the changes in the quoted message, content validation program 200 ends.

For example, content validation program 200 uses text formatting techniques to indicate the changes made to the original message that are included within the quoted message. A word that is substituted, but is a synonym for the original word, may be displayed in a green color and may be bolded or underlined for clear identification of a change. A word that is substituted, but is an antonym, may appear bolded or underlined, but in red color, to indicate that the substituted word significantly alters the purport or meaning of the original message. Additional formatting techniques may present added words in uppercase text, whereas omitted words may appear in parenthesis. Bolding, underlining, change of text color, italics, upper case, font style, font size, enclosed in quotes, enclosed in brackets, enclosed in braces, enclosed in parenthesis, enclosed in greater than/less than, superscript, subscript, enclosed in non-alpha-numeric characters, and enclosed in symbols, are all possible formatting techniques that may be used individually or in combination, to identify and indicate different types of changes or to augment the identification of changes described above, such as for color blindness.

In one embodiment of the present invention, content validation program 200 identifies changes made the content of an original email that is included in an email reply. Content validation program 200 enables the correction of the change, restoring the content to that of the original email included in the email reply, and facilitates the delivery of the correction to original recipients of the email reply.

One skilled in the art will recognize that many different implementations are possible for the analysis of differences between the original and quoted message. Similarly, different techniques may be used to produce a score indicating how closely the quoted message compares to the original message in content, and the extent of changes to the purport of the original message, by identifying antonyms and synonyms of replaced, omitted or added words. Many different techniques may also be used in implementing visual indicators of added, edited, substituted, or omitted words, as well as techniques to indicate that significantly different or an opposite meaning may result from edits made. The techniques described above serve as an example of a possible implementation.

Figure 3:
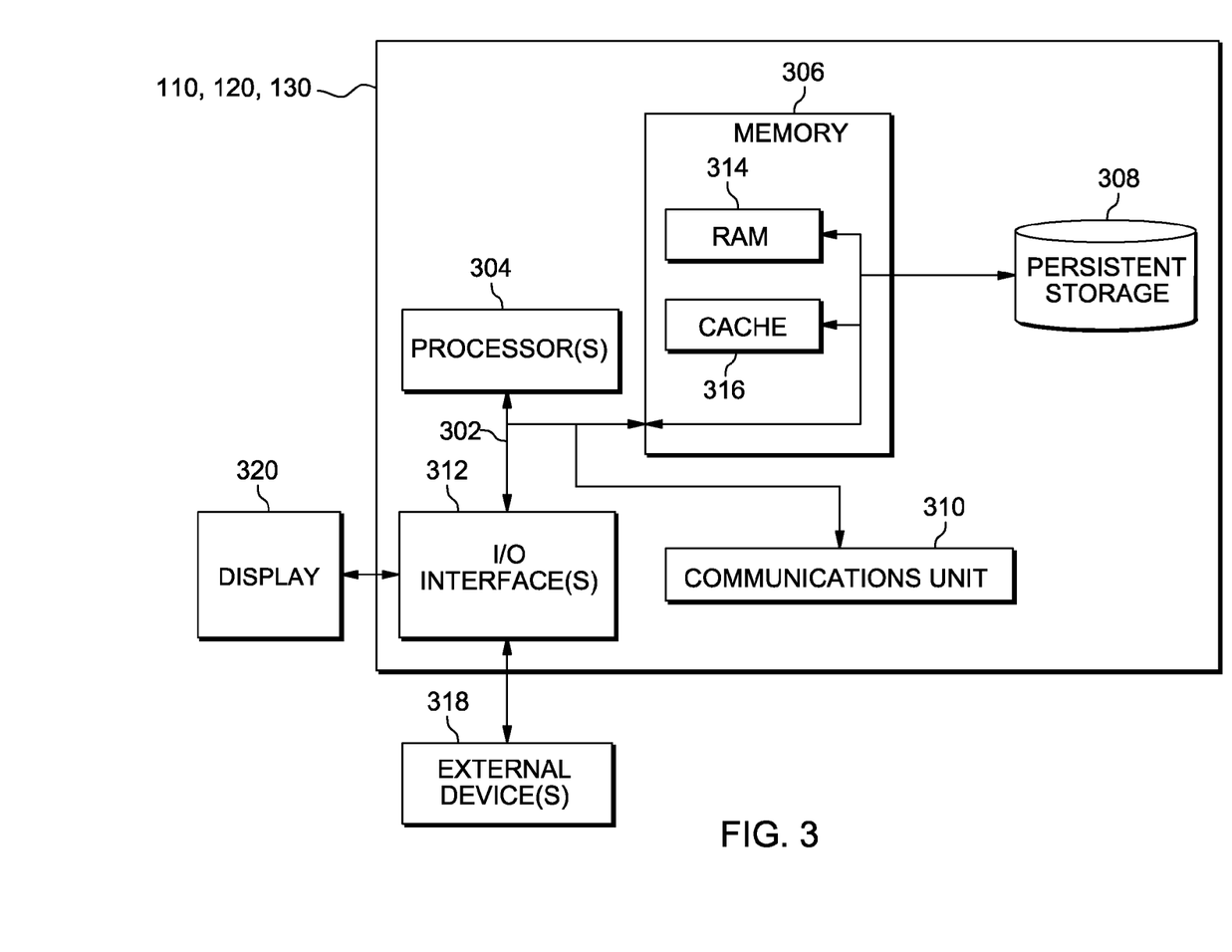
FIG. 3 depicts a block diagram of components of a computing device capable of operating the content validation program, in accordance with an embodiment of the present invention.

FIG. 3 depicts a block diagram of components of computing devices 110, 120, and 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing devices 110, 120, and 130 include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Content validation program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of distributed communications environment 100 and computing devices 110, 120, and 130. In these examples, communications unit 310 includes one or more network interface cards. Communications unit 310 may provide communications through the use of either or both physical and wireless communications links. Content validation program 200 may be downloaded to persistent storage 308 through communications unit 310.

I/O interface(s) 312 allows for input and output of data with other devices that may be connected to server computer 102. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., content validation program 200, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for validating content included in an electronic communication, the computer program product comprising:
   one or more computer-readable storage media and program instructions stored on the one or more computer-readable storage media, the program instructions comprising:
   program instructions to receive an initial communication and a subsequent communication, the subsequent communication including content from the initial communication;
   program instructions to determine if the content of the initial communication is altered as it appears in the subsequent communication; and
   in response to determining that the content of the initial communication is altered as it appears in the subsequent communication, program instructions to generate a validation score of the subsequent communication by comparing the content of the initial communication as it appears in the subsequent communication and the content of the initial communication as it appears in the initial communication, and by determining whether a purport of the content of the initial communication has changed.

2. The computer program product of claim 1, further comprising:
   in response to determining that the content of the initial communication as it appears in the subsequent communication is altered as compared to the content of the initial communication as it appears in the initial communication, program instructions to apply a formatting technique to visually distinguish altered content of the initial communication appearing in the subsequent communication, from non-altered content of the initial communication appearing in the subsequent communication.

3. The computer program product of claim 2, wherein, the formatting technique, includes one or a combination of: bolding, underlining, change of text color, italics, upper case, font style change, font size change, enclosed in quotes, enclosed in brackets, enclosed in braces, enclosed in parenthesis, enclosed in greater than/less than characters, superscript, subscript, enclosed in non-alpha-numeric characters, enclosed in symbols.

4. The computer program product of claim 1, further comprising:
   in response to determining that the content of the initial communication as it appears in the subsequent communication is altered, program instructions to determine a particular type of alteration made to the content of the initial communication as it appears in the subsequent communication, wherein the particular type of alteration includes one or a combination of: an addition of content, an omission of content, a substitution of content, and a modification of content; and
   program instructions to display an indicator of the particular type of alteration that is made to the content of the initial communication as it appears in the subsequent communication, wherein the indicator is consistently associated with the particular type of alteration.

5. The computer program product of claim 1, further comprising:
   program instructions to determine if the content of the initial communication as it appears in the subsequent communication is a translation of the initial communication to another language, based on the validation score; and
   in response to determining the content of the initial communication as it appears in the subsequent communication is the translation of the initial communication to another language, program instructions to display a message indicating the content of the initial communication as it appears in the subsequent communication to be the translation.

6. The computer program product of claim 1, further comprising:
   program instructions to display the validation score, wherein displaying the validation score includes an audio alert and a visual display associated with the subsequent communication.

7. The computer program product of claim 1, further comprising:
   program instructions to determine if the subsequent communication is an email reply to the initial communication, wherein the initial communication is an email, and the initial communication and the subsequent communication each include a recipient field and a content field;
   program instructions to determine whether an alteration has been made to content in the content field of the initial communication as it appears in the subsequent communication; and
   in response to determining that the subsequent communication is an email reply and includes the alteration that has been made to the content in the content field of the initial communication as it appears in the subsequent communication, program instructions to restore the content of the content field of the subsequent communication to reflect the content of the content field of the initial communication as it appears in the initial communication.

8. A system for validating content included in an electronic communication, the system comprising:
   one or more computer processors;
   one or more computer-readable storage media;
   program instructions stored on the computer-readable storage media for execution by at least one of the one or more processors, the program instructions comprising:
   program instructions to receive an initial communication and a subsequent communication, the subsequent communication including content from the initial communication;
   program instructions to determine if the content of the initial communication is altered as it appears in the subsequent communication; and
   in response to determining that the content of the initial communication is altered as it appears in the subsequent communication, program instructions to generate a validation score of the subsequent communication by comparing the content of the initial communication as it appears in the subsequent communication and the content of the initial communication as it appears in the initial communication, and by determining whether a purport of the content of the initial communication has changed.

9. The system of claim 8, further comprising:
   in response to determining that the content of the initial communication as it appears in the subsequent communication is altered, program instructions to determine a particular type of alteration made to the content of the initial communication as it appears in the subsequent communication, wherein the particular type of change includes one or a combination of: an addition of content, an omission of content, a substitution of content, and a modification of content; and program instructions to display an indicator of the particular type of alteration that is made to the content of the initial communication as it appears in the subsequent communication, wherein the indicator is consistently associated with the particular type of alteration.

10. The system of claim 8, further comprising:
program instructions to determine if the content of the initial communication as it appears in the subsequent communication is a translation of the initial communication to another language, based on the validation score; and in response to determining the content of the initial communication as it appears in the subsequent communication is the translation of the initial communication to another language, program instructions to display a message indicating the content of the subsequent communication to be the translation.

11. The system of claim 8, further comprising the step of:
program instructions to display the validation score, wherein displaying the validation score includes an audio alert and a visual display associated with the subsequent communication.

12. The computer program product of claim 1, wherein the content of the initial communication is text-based content.

13. The computer program product of claim 12, wherein determining whether a purport of the content of the initial communication has changed comprises:
determining whether an addition of a negation has been made to the content of the initial communication as it appears in the subsequent communication.

14. The computer program product of claim 12, wherein determining whether a purport of the content of the initial communication has changed comprises:
determining whether an omission of a negation has been made to the content of the initial communication as it appears in the subsequent communication.

15. The computer program product of claim 12, wherein determining whether a purport of the content of the initial communication has changed comprises:
determining whether the content of the initial communication as it appears in the subsequent communication includes an antonym that has been substituted for a word in the content of the initial communication as it appears in the initial communication.

16. The computer program product of claim 12, wherein the program instructions to determine a validation score comprise:
program instructions to determine a validation score based on one or more of:
comparing a part of speech of a portion of text-based content of the initial communication as it appears in the initial communication, to a part of speech of the portion of text-based content of the initial communication as it appears in the subsequent communication;
determining whether a negation term has been added in the text-based content of the initial communication as it appears in the subsequent communication;
determining whether a negation term has been omitted from the text-based content of the initial communication as it appears in the subsequent communication;
determining whether a term has been substituted in the text-based content of the initial communication as it appears in the subsequent communication;
determining whether a substituted term of the text-based content of the initial communication as it appears in the subsequent communication is one of: a synonym, an antonym, and a modifier of a term of the text-based content of the initial communication as it appears in the initial communication; and
determining a quantity of words of the text-based content of the initial communication as it appears in the subsequent communication that match words of the text-based content of the initial communication as it appears in the initial communication.

17. The system of claim 8, wherein the content of the initial communication is text-based.

18. The system of claim 17, wherein determining whether a purport of the content of the initial communication has changed comprises:
determining whether an addition of a negation has been made to the content of the initial communication as it appears in the subsequent communication.

19. The system of claim 17, wherein determining whether a purport of the content of the initial communication has changed comprises:
determining whether an omission of a negation has been made to the content of the initial communication as it appears in the subsequent communication.

20. The system of claim 17, wherein determining whether a purport of the content of the initial communication has changed comprises:
determining whether the content of the initial communication as it appears in the subsequent communication includes an antonym that has been substituted for a word in the content of the initial communication as it appears in the initial communication.

* * * * *